3,084,994
METHOD FOR RECOVERY OF SELENIUM FROM A SELENIUM OR ITS COMPOUNDS-ENRICHED SOLUTION

Akira Yomiyama and Shigeru Yonekawa, Tokyo, Japan, assignors to Asahi Kasei Kogyo Kabushiki Kaisha, Osaka, Japan, a corporation of Japan
No Drawing. Filed Oct. 17, 1960, Ser. No. 62,828
Claims priority, application Japan Sept. 8, 1960
5 Claims. (Cl. 23—139)

The present invention relates to a method for recovery of selenium from a solution enriched with selenium or compounds thereof. More specifically, the present invention concerns a method wherein unsaturated aldehyde or nitrile such as acrolein or acrylonitrile is prepared from unsaturated hydrocarbons such as propylene by the use of selenium or compounds thereof. The selenium or its compounds contained in the product gas are caught in water or slightly alkaline water, and then selenium is recovered from the enriched solution to reuse the recovered selenium for the manufacture of the unsaturated aldehyde or nitrile.

It is an object of the present invention to provide a method for recovery of selenium or compounds thereof from an aqueous solution containing the same.

It is another object of the present invention to provide a simple and reasonable method for recovery of selenium used for synthesis of unsaturated aldehyde or nitrile from such unsaturated hydrocarbons as propylene from a solution enriched with selenium or compounds thereof, the solution being obtained by washing the synthesis gas with water or slightly alkaline water.

It is a further object of the present invention to recover valuable selenium from the synthesis gas and to reuse the recovered selenium for the synthesis of unsaturated aldehyde or nitrile.

According to the present invention, an aqueous solution enriched with selenium or compounds thereof is introduced into an oxidation zone maintained at a temperature of 500°–700° C. in the presence of an oxidation catalyst of copper oxide, iron oxide and/or nickel oxide, together with oxygen or molecular-oxygen containing gas. The aqueous solution may be concentrated before said introduction. The selenium or selenium compounds contained therein are recovered in the form of selenium dioxide which can be useful for synthesis of unsaturated aldehyde or nitrile.

The present invention can most effectively be applied in connection with synthesis of unsaturated aldehyde or nitrile from such unsaturated hydrocarbons as propylene, and therefore the present invention is hereinafter illustrated with regard to such synthesis.

The synthesis gas produced from unsaturated hydrocarbons is introduced in a cooling zone into which water of pH 7–9 and of a temperature below 50° C. is sprayed to effect direct contact of the gas and water, whereby selenium or compounds thereof contained in the gas are caught in the water. The water may further be introduced into a water drops separation zone to separate it from the gas, and then, after having been adjusted to the above temperature and pH, be sprayed again into the cooling zone to enrich selenium content in the water. The enriched water usually contains unsaturated aldehyde or nitrile as well as selenium or compounds thereof.

The enriched water is introduced together with a stream of oxygen or molecular oxygen-containing gas such as air into an oxidation zone over or through an oxidation catalyst of oxides of copper, iron and/or nickel.

The temperature of the zone must be at or above 500° C., because the catalyst may combine with selenium or compounds thereof at a temperature below 500° C., and activity of the catalyst is reduced above 700° C.

The catalyst may be in the form of CuO, $Fe_2O_3$ or NiO. The catalyst may be used in the form of a fixed bed and may be carried on a carrier such as silica, diatomaceous earth and the like.

The enriched water is pumped into the zone suspended in oxygen or molecular oxygen-containing gas such as air. The water is atomized in air or oxygen stream so that water evaporates and oxidation combustion is smoothly carried out. The suspending gas flow may be fed at a space velocity of 10,000–30,000. Contact time is 0.12–0.36 second.

The effluent gas contains selenium in the form of $SeO_2$. The effluent gas may be mixed directly with unsaturated hydrocarbons to produce unsaturated aldehyde or nitrile. Alternately, the effluent gas may be cooled to condense water in which $SeO_2$ is contained. The condensed water may be mixed with unsaturated hydrocarbons as above. The recovered $SeO_2$ gives the same catalytic effect for the synthesis of unsaturated aldehyde or unsaturated nitrile as elemental selenium. So, the recovered $SeO_2$ can be reused without reduction of elemental selenium.

Example 1

Propylene was mixed with air to the extent of 2.3% by volume of propylene. The mixed gas was heated to 310° C. and contacted with elemental selenium. The selenium evaporated to be included in the product gas at concentration of 1.4 gms./m.$^3$. The gas was fed to a furnace having predominant catalyst of copper oxide, together with ammonia, until it was heated to 400° C. The gas was further fed to a furnace having a catalyst of molybdenum oxide and a synthesis gas containing 1.65% by volume of acrylonitrile was obtained. The synthesis gas was fed to a venturi scrubber into which water maintained at 20° C. and at pH 8.2 was poured, until the temperature of the gas was reduced to 50° C. The gas was fed to a cyclone to separate gas from water.

The separated water was controlled to a temperature of 20° C. and to pH 8.2 and again cycled to the venturi scrubber. The gas left the scrubber contained 0.02 gms./m.$^3$ of selenium. Water fed to the scrubber was repeatedly cycled until selenium was raised to 10.2 gms./liter. The water was concentrated at normal pressure and 90° C. up to selenium concentration of 102 gms./liter. The water was pumped at the rate of 1 liter/hr. and at space velocity of 20,000 accompanied by air (13 m.$^3$/hr.) into a furnace packed with 650 cc. of copper oxide carried on silica gel and maintained at 550° C. The effluent gas contained selenium of 8.77 gms./m.$^3$. The gas was cooled to 7° C. to obtain 964 cc. per hour of an aqueous solution containing 105 gms./liter of selenium.

Yield was 99.2% based on fed selenium. The aqueous solution was added to air-stream containing 2.3% by volume of propylene to the extent that selenium was contained at concentration of 1.4 gms./m.$^3$. The gas was reacted as mentioned above to produce 1.63% by volume of acrylonitrile.

Example 2

Example 1 was repeated except that the enriched water was introduced at 1 liter/hr. into the oxidation furnace of 650° C. and being packed with 650 cc. of nickel oxide carried on silica, accompanied by 13 m.$^3$/hr. of air, thereby to produce a gas containing 8.80 gms./m.$^3$ of selenium, and being volume rate of 11.5 m.$^3$ per hour. The yield of selenium was 99.0% based on selenium contained in the feed enriched water. The effluent gas was mixed with air containing propylene so that 2.3% by volume of propylene and 1.4 gms./m.$^3$ of selenium were contained. The mixture gas was reacted as in Example 1 to obtain 1.66% by volume of acrylonitrile.

What we claim is:
1. A method for recovering selenium from a gas containing selenium together wtih aldehyde and nitrile produced from the oxidation of unsaturated hydrocarbons, comprising
   (1) spraying water into a stream of the gas to collect the selenium, the water having a pH of 7 to 9 and a temperature below 50° C.,
   (2) separating the resultant selenium-containing water from the resultant gas-liquid mixture in a gas-liquid separation zone,
   (3) atomizing the selenium-containing water in molecular oxygen-containing gas,
   (4) contacting the resultant atomized mixture with oxide of a metal selected from the group consisting of copper, iron and nickel at a temperature of minimally 500° C. whereby selenium is oxidized to selenium dioxide, and
   (5) condensing the resultant gaseous selenium dioxide-water mixture by cooling.

2. Method of claim 1 wherein the oxide of a metal is CuO.
3. Method of claim 1 wherein the oxide of a metal is $Fe_2O_3$.
4. Method of claim 1 wherein the oxide of a metal is NiO.
5. Method of claim 1 wherein the temperature in (4) is between 500° and 700° C.

References Cited in the file of this patent
UNITED STATES PATENTS

| | | |
|---|---|---|
| 1,915,703 | Towne et al. | June 27, 1933 |
| 2,406,666 | Clarke et al. | Aug. 27, 1946 |
| 2,645,664 | Hadley et al. | July 13, 1953 |